United States Patent
Dagan

(10) Patent No.: US 8,667,334 B2
(45) Date of Patent: Mar. 4, 2014

(54) PROBLEM ISOLATION IN A VIRTUAL ENVIRONMENT

(75) Inventor: Assaf Dagan, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 12/870,418

(22) Filed: Aug. 27, 2010

(65) Prior Publication Data
US 2012/0054554 A1     Mar. 1, 2012

(51) Int. Cl.
*G06F 11/00* (2006.01)

(52) U.S. Cl.
USPC .......................................................... 714/37

(58) Field of Classification Search
USPC ...................................... 714/37, 39; 709/224
See application file for complete search history.

(56) References Cited

U.S. PATENT DOCUMENTS

| | | | |
|---|---|---|---|
| 5,704,036 A | 12/1997 | Brownmiller et al. | |
| 5,784,359 A | 7/1998 | Bencheck et al. | |
| 6,643,613 B2 | 11/2003 | McGee et al. | |
| 6,792,456 B1 * | 9/2004 | Hellerstein et al. | 709/224 |
| 7,076,695 B2 | 7/2006 | McGee et al. | |
| 7,240,325 B2 | 7/2007 | Keller | |
| 2005/0076113 A1 * | 4/2005 | Klotz et al. | 709/224 |
| 2006/0117059 A1 | 6/2006 | Freeman, Jr. et al. | |
| 2008/0016412 A1 | 1/2008 | White et al. | |
| 2013/0132778 A1 * | 5/2013 | Dagan | 714/37 |

OTHER PUBLICATIONS

Wikipedia Dictionary Definition of term "virtual environment": http://en.wikipedia.org/wiki/Virtual_environment, retrieved on Mar. 10, 2013.*

* cited by examiner

*Primary Examiner* — Yair Leibovich

(57) ABSTRACT

Problem isolation in a virtual environment is described. In one example, a method is disclosed which includes maintaining a topology of network devices in a virtual environment in a performance management database hosted on a problem isolation server. The network devices can be monitored for metrics breaching a baseline. A snapshot of portions of the topology associated with the metrics breaching the baseline can be captured using a snapshot module. The snapshot captured can include a partial topology. Time stamps associated with the metrics can be maintained. The time stamps can include time stamps for when the metrics breach the baseline. The time stamps can be correlated with the snapshot to form a problem isolation timeline.

15 Claims, 8 Drawing Sheets

PROBLEM ISOLATION IN A VIRTUAL ENVIRONMENT

BACKGROUND

The identification and tracking of dependencies between the components of distributed systems can be important for integrated fault management. Failures occurring in one service or part of a system can often affect other services, systems, devices, etc. Dependencies often exist between the components of different services on a single system and also between client and server components of a service across multiple systems and domains.

A service or system component can often have dependencies and also be dependent on another service or system component. Dependencies can exist between various components of a distributed system, such as end-user services, system services, applications and associated logical and physical components. However, service dependencies are often not explicit in today's systems, thus complicating tasks of problem determination, isolation and resolution.

Current solutions have a number of drawbacks. For example, dependencies may not be clearly identified in problem determination, isolation and resolution solutions. Also, current solutions can provide much more problem data to a system administrator than is useful, complicating the processes of problem determination, isolation and resolution. Furthermore, problem data that is provided to the system administrator may be presented in a manner which is difficult to interpret, time-consuming to sift through, and for which the system administrator often receives specialized training and experience to be able to understand and analyze.

Due to the heterogeneity of components of a distributed system with which the problem isolation process is involved, determining the impact of a system failure can be difficult given the limitations of existing techniques. Some additional shortcomings of existing techniques include: existing techniques address installation and deployment phases of a software product but do not attempt to capture runtime aspects; existing techniques do not deal with end-to-end applications or services that span multiple systems; software inventory information is often described in a proprietary format making sharing this information difficult among various heterogeneous systems; and existing techniques do not effectively discover and represent the topology of distributed applications and services. These drawbacks, and others, can result in wasted time, effort, and money.

DETAILED DESCRIPTION

Figure 1:
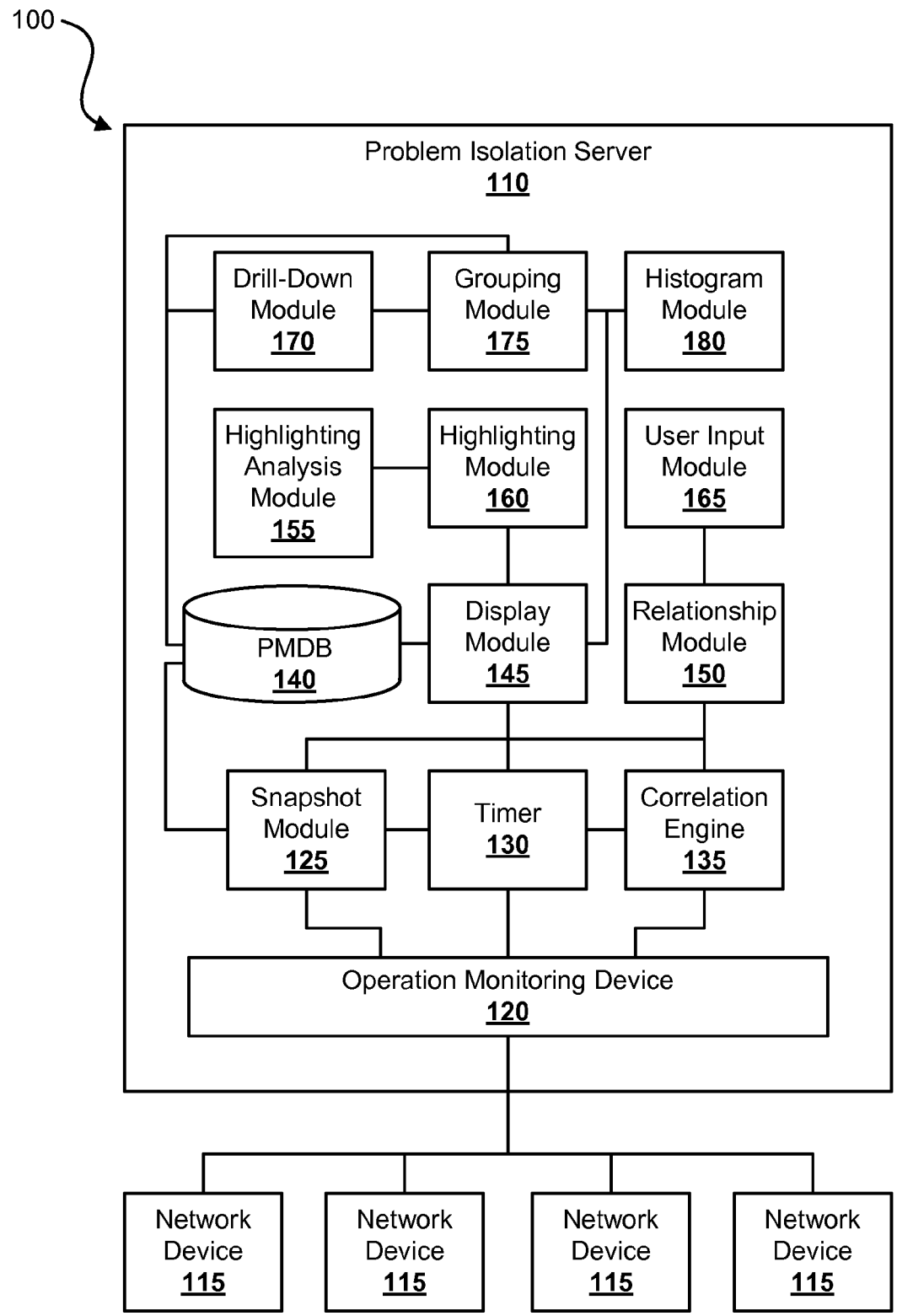
FIG. 1 is a block diagram of a system for isolating problems in a virtual environment in accordance with an example.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

There is a shift occurring in the way businesses view, comprehend, and map information technology (IT) resources to business goals. Many IT executives are beginning to re-orient the way IT resources are monitored and optimized based more directly on business needs. Businesses are focusing on how business processes provided by IT, such as order processing, are meeting business objectives rather than focusing solely on the availability and performance of the servers, routers, and applications that make up the IT infrastructure.

Systems and methods have been developed to allow organizations to monitor infrastructure and services from an IT perspective. For example, a business-focused metric might look at the dollar impact of server downtime as opposed to an IT-focused metric that identifies the percent uptime for the same server. Some such systems have used a Configuration Management Database (CMDB), where information about IT assets such as servers, routers, and desktops can be stored. The CMDB can include a history and interrelationships between system components. The CMDB in combination with business-focused metrics has enabled bi-directional communication between IT and business managers. These systems can provide solutions to various IT issues, including problem management.

A problem management process can have both reactive and proactive aspects. The reactive aspect is concerned with solving problems in response to one or more incidents. Proactive problem management is concerned with identifying and solving problems and known errors before incidents before such problems or incidents occur. Problems and known errors can be identified by analyzing incidents as they occur (reactive problem management), analyzing incidents over differing time periods (proactive problem management), analyzing an IT Infrastructure, and the provisioning of a knowledge database.

One part of a problem management process may include isolation of the problem in order to identify what the problem is. After a problem has been identified, an administrator can attempt to remedy the problem. The following disclosure describes problem isolation systems and methods. More particularly, problem isolation in a virtual environment is described herein. For example, a method is disclosed which includes maintaining a topology of network devices in a virtual environment in a performance management database hosted on a problem isolation server. The network devices can be monitored for metrics breaching a baseline. A snapshot of portions of the topology associated with the metrics breaching the baseline can be captured using a snapshot module. The snapshot captured can include a partial topology. Time stamps associated with the metrics can be maintained. The time stamps can include time stamps for when the metrics breach the baseline. The time stamps can be correlated with the snapshot to form a problem isolation timeline. The problem isolation described herein is directed primarily at reactive problem management, but may also be included in proactive problem management solutions.

Referring to FIG. 1, a system 100 is shown for correlating network operation metrics monitored from network devices 115 operating in a virtual environment. A virtual environment can include both virtual and physical aspects. For example, a plurality of virtual servers may reside on a physical server. A virtual network may be physically connected to a physical network. A virtual machine may comprise a software or hardware-assisted implementation of a machine (e.g., computer). Virtualization can enable creation of system infrastructure on demand, which in turn can enable a fast response to the ever-changing issues facing businesses. Virtualization can allow administrators to manage pooled resources across the enterprise. Virtualization gives developers a way to create test configurations, and then destroy them and start over, without the procurement time and expense of building a dedicated test system, and without disrupting primary operating systems. Server virtualization can bring a new level of availability to business applications that are more affordable and less complex to set up than the traditional methods. Virtualization techniques can extend to networks, storage, operating systems, applications, and laptop or server hardware, allowing better leverage of infrastructure investments.

Virtual systems tend to be more dynamic and flexible than purely physical systems and are frequently changed. As a result, problem isolation in a virtualized environment can be more challenging than in the purely physical systems. The system 100 of FIG. 1 can assist in isolating and identifying problems in a virtual environment, even after the environment has changed.

The system 100 can include a problem isolation server 110. The problem isolation server can be in communication with the virtualized environment. A performance management database (PMDB) 140 can reside on or be in communication with the problem isolation server and be configured to maintain a topology of configuration items (CIs) representing network devices 115 in the virtual environment. In one example, the network devices may be virtual devices running on one or more Hypervisor. In another example, the network devices may be actual physical devices on which the virtual environment operates.

The PMDB 140 can store a system topology (such as may be obtained from a CMDB), service level information, and business service measurements (or fact measures) within the context of a business service's specific hierarchy. The use of the PMDB can assist in problem isolation, business service optimization, and reporting on the results of analysis and/or on measurement data. A business service or a business service model may refer to system components such as hosts, virtual machines, and so forth. The hosts and virtual machines can have unique identifiers.

Monitoring systems may produce demand traces which can have the same unique identifiers as the hosts and virtual machines. When monitoring data is loaded into the PMDB via an extract, transform, load (ETL) process, a matching process can be performed to correlate monitoring data from a monitoring system with particular hosts and/or virtual machines in the business service topology.

The PMDB can include a data mart for storing data such as topology information, measurement data, etc. The data mart can record information about data stored in the data mart. For example, the data mart may store information such as the time the data was received, the server from which the data was received, a fact (such as topology or measurement data), a service associated with the fact, etc.

The CIs (Configuration Items) stored in the PMDB 140 can correspond to managed objects. For example, a managed object may be as simple as a central processing unit (CPU) or as complex as a business service of an enterprise. In other words, CIs can include hardware, software, or documentation of system components on virtually any scale. There are a large number of pre-existing data models with CI types that are defined to model information about complex business service topologies. Common application solution platforms such as SAP (System Analysis & Program development), .NET, MS (Microsoft) Exchange and others have models of CIs with known hierarchies that are specific to such platforms.

The PMDB 140 can include a reconciliation of information from the CMDB with operational usage information. A collector infrastructure of the PMDB can gather information from operational usage repositories and the CMDB. ETL content packs, which are software packages that facilitate the integration of data into data warehouses, can read operational usage information, create measurement tables within a data mart, and record measurements and time dimensions. Topology information from the CMDB can guide the content packs' definition of bridge tables, i.e., tables that maintain relationships, in the data mart that puts device measurements into context. In other words, the bridge tables can organize the measurements. Each CI in a topology can be inserted as a table row in the bridge tables and is a dimension for categorizing the measurement. Managed object identifier information that is common to both the operational data and the topology data can guide this reconciliation process so that each device is related to a relevant context.

For example, within the PMDB, a CPU measurement table may be associated with multiple dimensions that reflect a relationship with a virtual machine (VM), an application server, an application server pool, a constraint, etc. In prior solutions, a CPU measurement may have only been associated with a virtual machine of a particular physical server. In the systems described herein, the multiple dimensions of the relationship can reflect the context of the CPU measurement within the whole business service topology. Metrics, such as CPU usage or power usage at several levels of abstraction (e.g., for a particular application server or for a business service), can be quickly summarized or aggregated. In a similar manner, topology facts can be associated with constraints.

In one aspect, the monitoring system used with the PMDB 140 comprises an operation monitoring device 120. The operation monitoring device can monitor the virtual environment for network operation metrics. In a more specific example, the operation monitoring device can monitor the virtual environment for network device operation metrics breaching a baseline.

The system 100 can include an operations tracking module in communication with the operation monitoring device. In one example, the operations tracking module can be a sub-system of the operation monitoring device 120. Both the operations tracking module and the operation monitoring device can be in direct or indirect communication with the PMDB to access or store information related to the network devices 115. The operations tracking module can be configured to track network device operation. In particular, the operations tracking module can track operation of the network devices over a period of time to establish what is normal or usual device operation. In another example, the operations tracking module can be configured to track normal network device operation, or device operation which is known to not be problematic. In either example, the normal device operation metrics can be used to establish a baseline or a standard by which subsequently monitored metrics are compared. In one aspect, the operations tracking module can directly access data obtained from the operation monitoring device. In another aspect, the operations tracking module can retrieve metrics stored in the PMDB to establish the baseline. The operations tracking module can be configured to periodically update the baseline, for example if normal operation metrics have changed, if a system infrastructure has changed, etc.

The system 100 can include a breach detection module. In one example, the breach detection module can be a subsystem of the operation monitoring device 120. The breach detection module can be configured to detect when monitored network device operation metrics breach the baseline. In one example, the baseline comprises a baseline sleeve. The baseline sleeve can include a range of metrics, within which monitored network device operation metrics may be considered normal. The breach detection module can thus detect when monitored network device operation metrics breach the baseline sleeve, or fall outside of the "normal" range. When the breach detection module detects monitored network device operation metrics breaching a baseline or a baseline sleeve, a breach identification module can identify CIs in the PMDB related to the network device operation metrics breaching the baseline.

Problem isolation systems can detect problems in near real-time. Once a problem is detected a problem isolation system utilizing the technology described herein can take a topological snapshot of the problem using a snapshot module 125. The administrator can later analyze the problem and find a root cause even if the environment has changed due to the flexible nature of the virtualized environment.

The snapshot module 125 can group related CIs (Configuration Items) together using a processor and can form a snapshot of a problem topology based on the topology stored within the PMDB 140. In one example, the CIs grouped together can include those CIs identified by the breach identification module as being related to the network device operation metrics breaching the baseline. Thus, the snapshot of the problem topology may comprise a partial topology of the system rather than the entire system topology. Also, the partial topology includes those items relevant to the problem (i.e., the metric breaching the baseline) and is thus a focused and more easily digestible topology for a system administrator to consider. In other words, the snapshot excludes CIs not related to the network device operation metrics breaching the baseline. The snapshot can be stored in the PMDB. The snapshot can represent a state of the problem topology existing at the time of network device operation irregularities or breach of the baseline.

The system 100 can include a timer 130. The timer can be in communication with the operation monitoring device 120 and can be configured to maintain or obtain a time stamp for the operation data received on the problem isolation server 110. In one aspect, the timer can be a part of the PMDB 140 or in communication with the PMDB to store the time stamps of monitored network events and performance in the PMDB.

A data collector can be in communication with the problem isolation server and be configured to collect metric identifications and associated time stamps of operation data breaching a baseline sleeve in a metrics list. In one example, the data collector can be the PMDB or a portion of the PMDB and can receive the time stamps and performance information from the operation monitoring device 120. In another example, the data collector can be configured to retrieve the time stamps and metric identifications from the PMDB. The list of metric identifications in the metrics list can be prepared for display on a user display device as will be described in further detail below.

The system can include a correlation engine 135. The correlation engine can be configured to compare operation data from a plurality of metric identifications. For example, one or more metrics may be selected from the metrics list and the operation data of the selected metrics can be compared with the comparison engine. The system can also include an analysis module. The analysis module can be configured to analyze the compared operation data from the selected metric identifications to determine correlations between the metrics. In other words, the comparison engine can compare the two metrics together and the analysis module can determine how or to what extent the metrics are similar or dissimilar based on the comparison. In one example, the comparison engine and the analysis module may comprise a same, integral, single engine or module and the operations described above regarding the comparison engine and the analysis module can be performed by the single engine or module. In another example, the comparison engine is configured to compare and correlate selected metrics while the analysis module can provide an underlying basis or method of comparison for use by the comparison engine. For example, the analysis module may comprise a linear analysis module, a statistical analysis module, an event to event analysis module. The analysis module may also be configured to perform or provide a basis for any other suitable form of analysis. In one aspect, the analysis module is configured to receive a user selection of a desired form of analysis via the GUI and the comparison engine utilizes the user-selected analysis method.

The system 100 can include a display module 145. The display module can be configured to graphically display monitored metrics or operation data associated with metric identifications in a network operation graph. As described above, a list of metrics breaching a baseline can be assembled.

The display module can enable a user to drag one or more selected metrics on a graphical user interface (GUI) from the metrics list to a correlation window. The display module can be configured to graphically represent the snapshot, including relationships of the related CIs, for display on a user display device. The snapshot can be transmitted over a bus or a network connection to a user display device to display the snapshot of the topology existing at the time of the metric baseline breach, even after a change in the topology of the virtualized environment. Additional capabilities enabled by the display module will be described in further detail below.

The system can include a baseline module. In one example, the baseline module can be a subsystem of the operation monitoring device 120. The baseline module can be configured to monitor normal network device operation to determine the baseline sleeve and to display the baseline sleeve on the network device operation graph simultaneously with the graphically displayed metrics or metric identifications.

The system can include a time slider (see discussion of FIG. 2 below) or time slider module configured to adjust a time view of the network device operation graph by sliding the time view forward or backward in time. The time slider module can be configured to redraw the network device operation graph and the baseline sleeve when a user slides the displayed time view forward or backward in time so that characteristics of the metric displayed on the network device operation graph during the adjusted time view are accurately displayed.

The system can include a relationship identification module 150. The relationship identification module can be configured to identify relationships between the portions of the topology associated with metrics breaching the baseline. The relationships may be any type of relationship. For example, the relationships may comprise topological, chronological, causal, or other types of relationships. The relationship identification module can be in communication with the display module 145 to display the relationships between the portions of the topology associated with the metrics breaching the baseline. The display of these relationships will be described in further detail below.

The relationship identification module 150 can include a user input module 165. The user input module can enable a user to select a type of relationship for the relationship identification module to identify. As described above, the type of relationship can be selected from causal, topological, chronological and other types of relationships. For example, the display module 145 can display a menu or list on a display device, where the user can select various modes or options for viewing data, snapshots, etc. A relationship type can be one of the options selected by the user and can affect how the snapshot is displayed. Relationships between CI's displayed from the snapshot can be shown, for example, by lines extending between display objects representing the CIs from the snapshot.

The system 100 can include a highlighting module 160. The highlighting module can enable a user to highlight a portion of the snapshot based on a displayed time position of a displayed problem isolation timeline. In another example, the highlighting module can cause a portion of the snapshot to be highlighted based on a displayed time position of the problem isolation timeline.

The system can also include a highlighting analysis module 165. The highlighting analysis module can be configured to identify a number of metrics associated with time stamps occurring during the displayed time position of the problem isolation timeline. The highlighting analysis module can further instruct the highlighting module to highlight multiple portions of the snapshot when multiple metrics are associated with time stamps occurring during the displayed time position of the problem isolation timeline.

The system 100 can include a drill down module 170. The drill-down module can enable a user to select a network device 115 using a user input device from a snapshot graphically displayed on a display device to view additional details regarding one or more metrics associated with a network device which breached the baseline. For example, the additional details may be displayed in a drill-down window and may include a detailed description of any changes that occurred on the network device which may have caused the operation of the network device to breach the baseline. The detailed description can include a date and/or time at which the changes occurred. Various other relationships, attributes, data values, etc. can also be included in the detailed description or additional details.

The system 100 can include a metric grouping module 175. The metric grouping identification module can be configured to identify metric groupings for the metrics breaching the baseline. In other words, the metric grouping identification module can be configured identify metric groupings for the metrics displayed or included in the snapshot. For example, CI groupings may include application CIs, database CIs, system CIs, and so forth. The metric groupings can be displayed on the display device by the display module.

The system 100 can include a histogram creation module 180. The histogram creation module can be configured to create a histogram of the metrics breaching the baseline. The histogram can identify a frequency of baseline breaches for each of the metric groupings identified by the metric grouping identification module 175.

The problem isolation features described above may be a part of a problem isolation and investigation user interface and can be a part of a graphical user interface (GUI) which allows easier analysis of large quantities of metrics using various user-selectable correlation methods. Some of the features enabled by the system components described above include enabling a user to click on snapshot topology and see specific metrics for a transaction. The system can monitor and show problems from various different locations or systems. Through the GUI, a user can drill-down from the topology view to see additional details, graphs, etc., regarding a selected topology item. A timeline graph is provided which enables a user to move forward and backward along the timeline to view events at different time periods. As a user moves or hovers, a cursor may appear over the timeline graph, and specific changes that happened at the time corresponding to the position of the cursor on the timeline graph can be displayed to the user. CIs with events during a displayed portion of the timeline can be highlighted on the snapshot topology, which may be shown in graph above the timeline graph. In one example, topology items in the displayed snapshot can get gradually darker as a position on the timeline approaches event occurrence or occurrence of problems. In another aspect, topology items in the displayed snapshot can be darker or highlighted when an event or problem corresponding to the topology item is shown on the timeline.

The processes or system components described above can result in well-defined graphs which represent performance of the network operation metrics. The network operation metrics and/or the graphs representing the performance of the network operation metrics can be stored and used later on by an application owner or administrator who is trying to analyze the problem and a root cause of the problem. Since the problem isolation system has captured the metrics at the time the problem occurred, the system can also show any related change that happened around that time. The ability to capture and record metrics can be valuable where more IT organizations are rapidly moving into virtualized environments. Virtual environments are often flexible and virtual machines can move from one hypervisor to another in a single click. As a result, use of monitored metrics in correlation of metrics can assist in analyzing problems and tracking changes that happen around the time of the problem.

While analyzing problems in a virtualized environment, the topology of the IT system at the time of the problem and any changes that occurred at or near that time can be useful in understanding the problem. The flexible architecture of virtual environments tends to create situations where the environment has changed, such as a machine moving from one hosting server to another for example, between the time the problem was detected and the time when the administrator can analyze the problem. Such scenarios can mislead or confuse a user and the user may spend time trying to analyze irrelevant configuration items.

As described above, problem isolation systems can detect abnormalities or irregularities of metrics of CIs in near real-time analysis. Metrics can be defined as abnormal, irregular, or anomalous if continuously breaching a baseline or baseline sleeve. The systems can implement analysis cycles to periodically detect abnormal metrics. The analysis cycles can be set to run at predetermined time intervals, such as every five minutes for example. On each analysis cycle, the problem isolation system can detect all continuously abnormal metrics, find the related configuration items for each metric, group all related configuration items based on an Operations Database (ODB) model within the PMDB, and connect each group of CIs on a graph which represents a single metric's performance.

Figure 2:
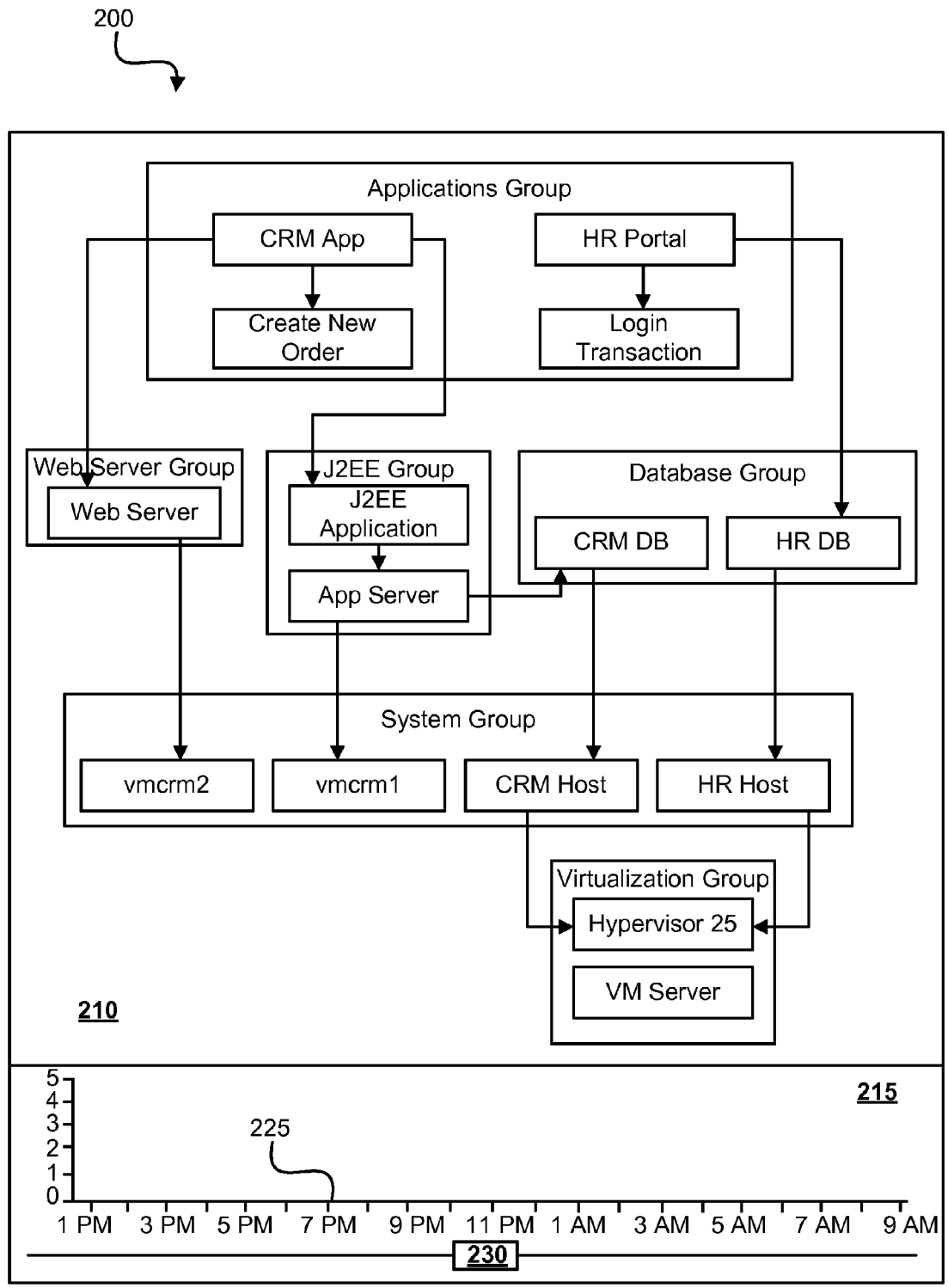
FIG. 2 is a view of a snapshot of a problem topology in accordance with an example.

FIG. 2 represents an example display 200 including a snapshot 210 captured by the snapshot module described above regarding FIG. 1. The snapshot can be represented by a graph showing a relationship between the CIs or topology portions grouped together to form the snapshot. In the example shown in FIG. 2, the CIs within the snapshot group can further be grouped into more specific CI sub-groups. For example, the snapshot CIs can be organized by an applications group, a web server group, a database group, a system group, a virtualization group, and so forth. Each CI within the snapshot can be identified within the sub-groups. For example, the applications group can include a CRM application, a Create New Order application, a human relations (HR) portal, a login transaction, and so forth.

Thus, the relationships included in the snapshot may comprise the CI sub-groups. In another example, however, the relationships can include causal relationships. For example, if the Hypervisor 25 metrics breached the baseline, an administrator may find a causal relationship useful in determining a root cause of the Hypervisor 25 issue by following a call path back from Hypervisor 25 to CRM Host to CRM Database (DB) to the J2EE Application Server to the J2EE Application to the CRM Application.

In another example, the relationships included in the snapshot may comprise chronological relationships. For example, the snapshot may show which CIs breached the baseline in which order. The CIs illustrated in the graph of the snapshot can be organized according to a time of baseline breach or even a duration of the baseline breach. For example, earlier occurring breaches can be near the top of the graph and later occurring breaches can be near the bottom of the graph. As another example, earlier occurring breaches can be near the left side of the graph and later occurring breaches can be near the right side of the graph. The graph can also include a timeline to illustrate a time of occurrence or a duration of the breach.

In another example the relationships included in the snapshot may comprise topological relationships. For example, the graph of the snapshot may show which CIs are related or how the CIs are related, if at all, according to actual connections or communication paths between CIs.

In one example, CIs or portions of the topology associated with metric baseline breaches or irregularities can be grouped together when the network device operation irregularities occur within a predetermined time interval from one another.

The GUI can display monitored metrics or various data regarding the monitored metrics. In one aspect, the GUI can be configured to display only those metrics or CIs with operations breaching a baseline or a baseline sleeve. The GUI can display various information about a metric, such as when the metric is selected by a user, or when a cursor hovers over a CI included in the snapshot. For example, some information which may be displayed can include a name of the metric, a dimension of the metric, what data collector is monitoring the metric, when abnormal metric performance began, and a preview of a graph of the metric performance. The metrics shown in FIG. 2 are further organized according to groups. The groupings can be according to application, business service, function, location, or any of a variety of other potential group identifications. The dimensions can include a variety of different metrics dimensions. For example, a dimension may be a location of the monitored metric or a name of the CI associated with the metric name. The abnormal start time can include both a date and a time of when abnormal operation performance began.

The display 200, or GUI, can include a timeline display area 215. In one aspect, the GUI can be configured to enable a user to select a metric from the snapshot above the timeline display area. In response, a graph can be shown along a timeline 225 in the timeline display area with a time frame of the timeline corresponding to an event occurrence associated with the selected metric. Repeated selection of the metric on the snapshot can cycle through additional event occurrences associated with that metric at different points along the time line.

The graph shown on the timeline can represent a more precise time of event occurrence within a displayed time frame. A size of the graph can indicate a duration of the event, a number of event occurrences at that time, a severity or significance of the event, or any other desirable aspect of the event. A time slider 230 can also be shown in the timeline display area. The time slider can enable an administrator to slide the graph of monitored data backward and forward in time to obtain different views of the graph at different time periods. For example, the time slider can be configured to slide to the right or to the left corresponding to user input. Movement of the time slider to the right can advance the graph and the time line to a position later in time. Movement of the time slider to the left can advance the graph and the time line to a position earlier in time.

Figure 3:
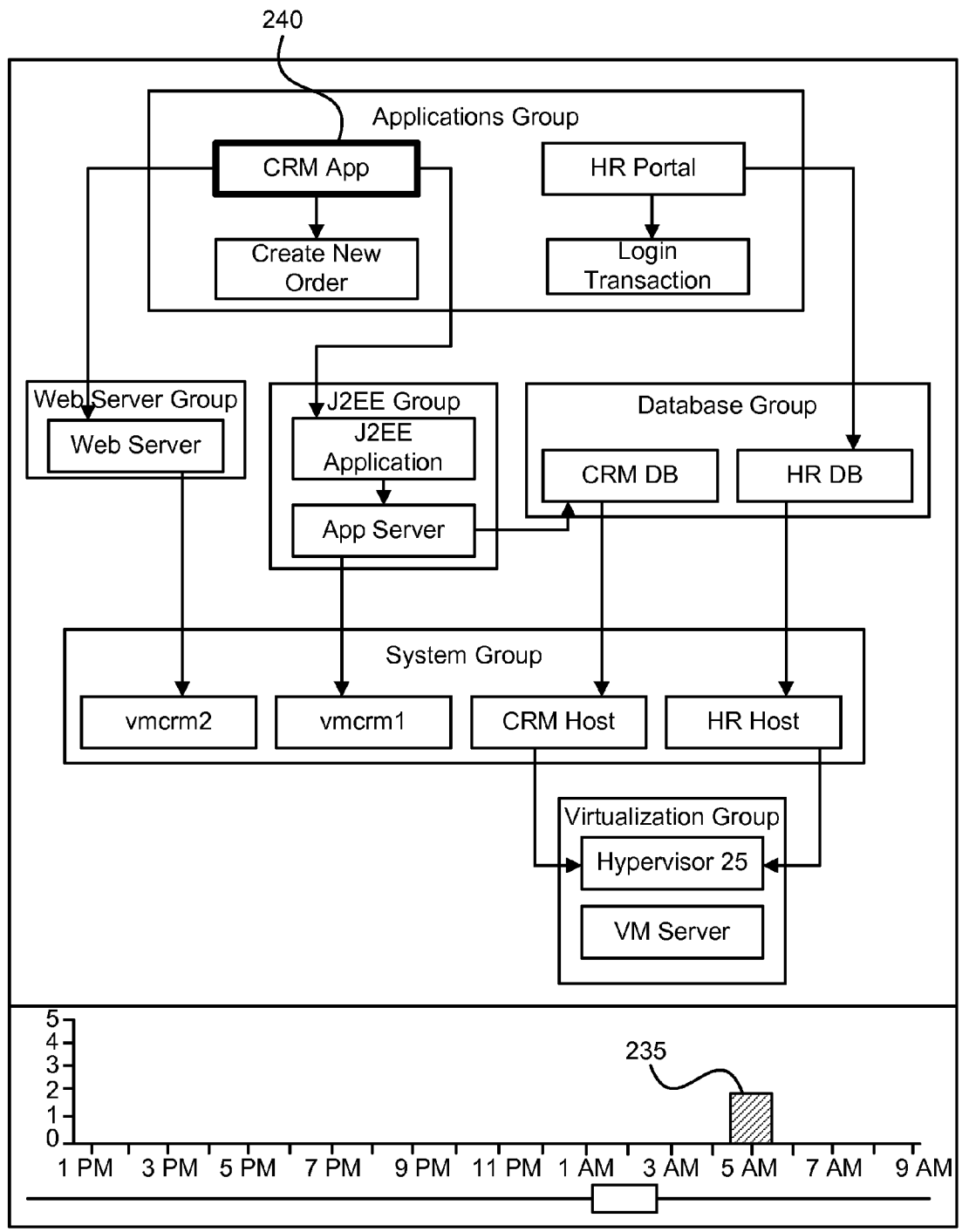
FIGS. 3-5 are views of a snapshot of a problem topology with a configuration item highlighted to correspond with an event shown on a timeline in accordance with an example.

Referring to FIG. 3, a block diagram of a GUI for displaying monitored metrics and associated data is shown which includes the snapshot, timeline, and other display features as described above regarding FIG. 2. FIG. 3 includes an event 235 on the timeline indicating an event that occurred at time corresponding to the position of the event along the timeline. The CRM App 240 in the snapshot above is highlighted to enable a user to quickly and easily identify which portion of the snapshot corresponds to the event.

Figure 4:
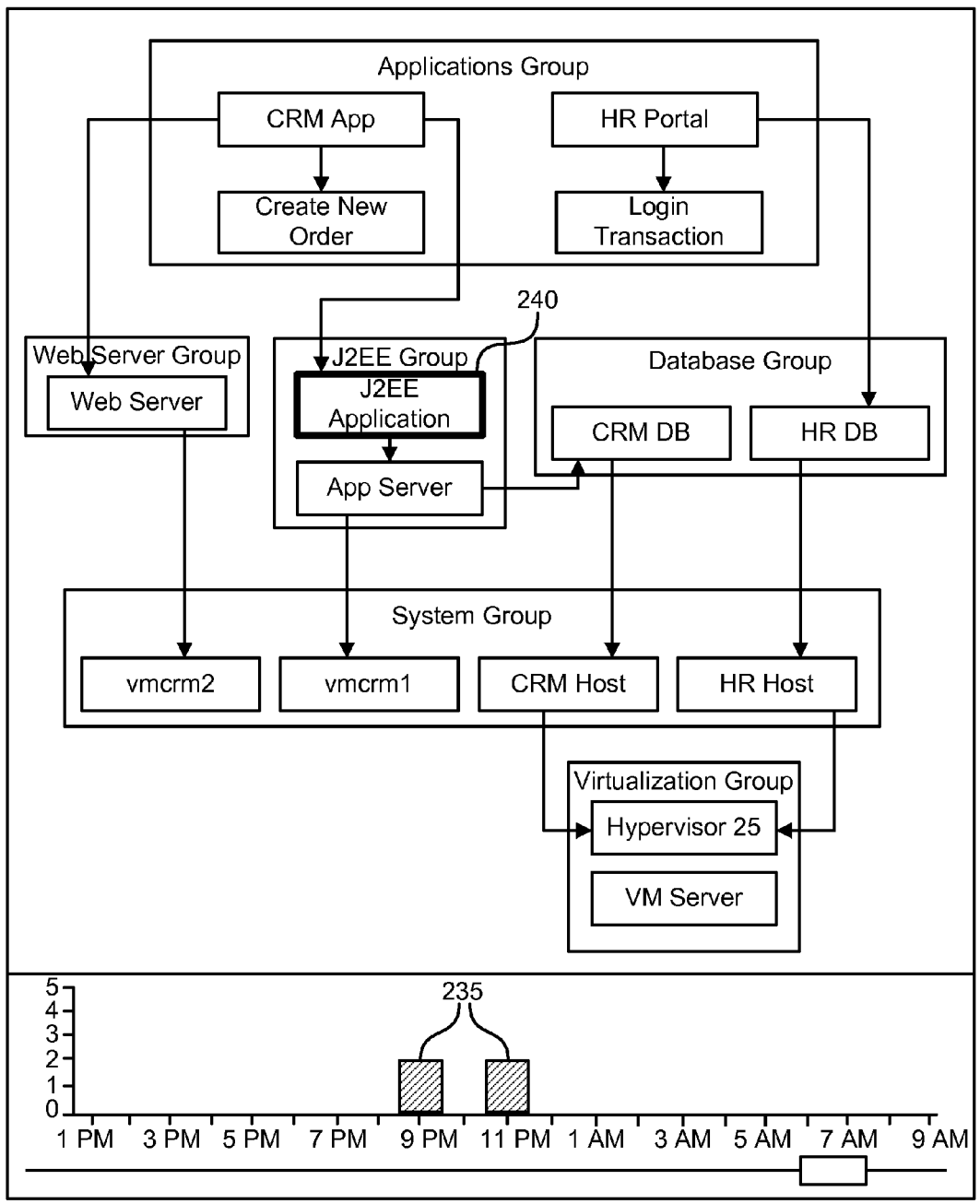

Referring to FIG. 4, a block diagram of a GUI for displaying monitored metrics and associated data is shown which includes the features described above regarding FIG. 2. FIG. 4 illustrates multiple events occurring within a selected time frame and displayed at different positions along the timeline. In this example, both events are related to the J2EE Application 240, and thus the J2EE application is the only portion of the topology highlighted.

Figure 5:
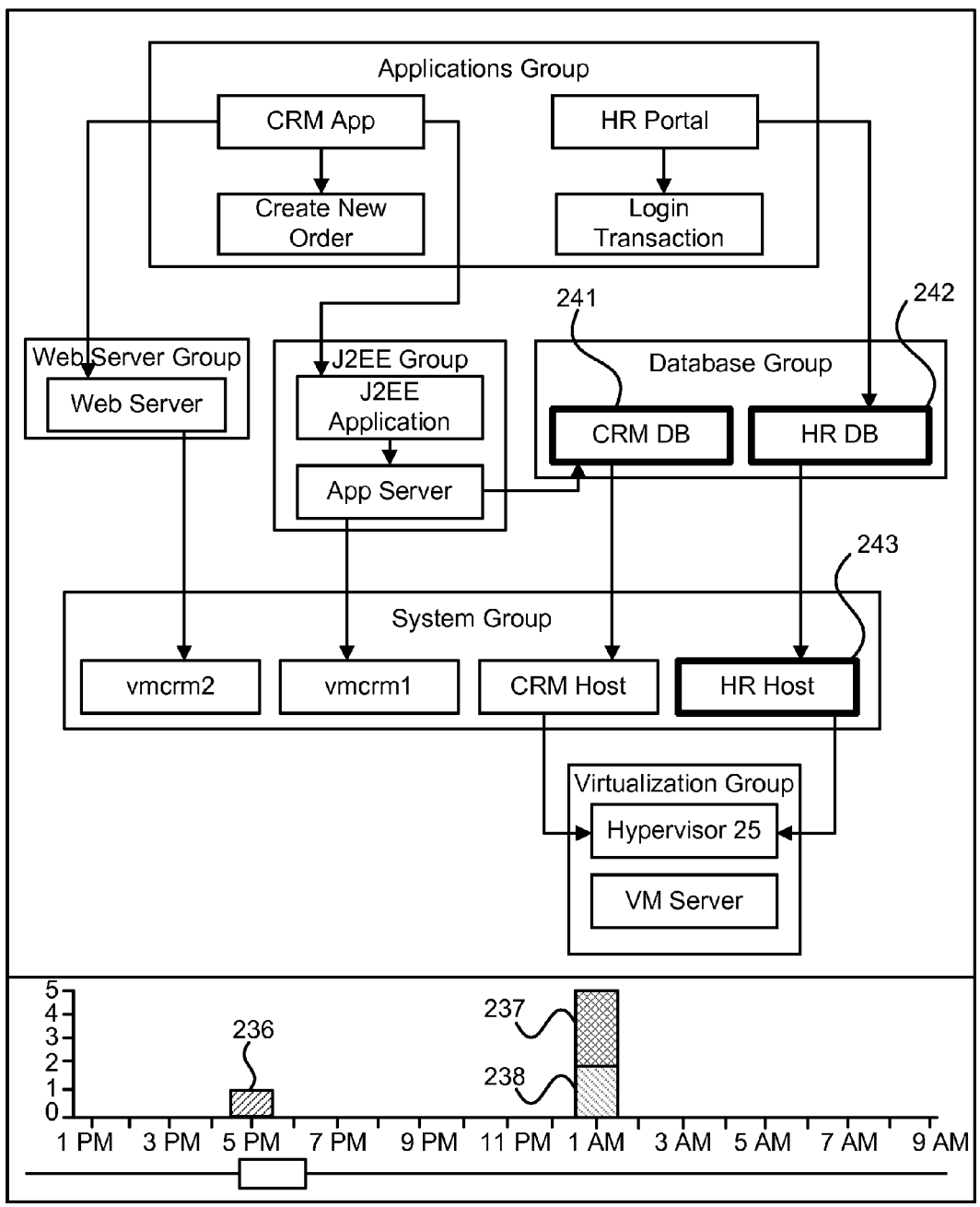

Referring to FIG. 5, a block diagram of a GUI for displaying monitored metrics and associated data is shown which includes the features described above regarding FIG. 2. FIG. 5 illustrates multiple events related to multiple different portions of the topology occurring within a selected time frame and displayed at different positions along the timeline. The events 236, 237, 238 shown along the timeline can be marked as being related to different CIs 241, 242, 243 in the topology. For example, events 236-238 each include different shading to indicate association with a different CI. In one aspect, the events can be marked by color. The CIs highlighted on the snapshot can be highlighted in a similar color as the events on the timeline below. Other schemes for marking/highlighting and/or correlating events and CIs will be apparent and are considered within the scope of this disclosure.

In one aspect, the CI's on the snapshot can all be highlighted in a similar manner. When a user hovers a cursor over an event on the timeline, the highlighting of the CI corresponding to the event can change to identify the CI as being associated with the event. Likewise, when a user hovers a cursor over a CI on the snapshot, the event on the timeline can be highlighted or other indication provided to identify the event as being associated with the CI.

Metrics can be monitored continuously over very long periods of time. Identification of problems, events, snapshots, etc. of all of the monitored data can be excessive and put a significant strain on a computer processor, even if the computer processor is able to process the large amount of data. Therefore, a time frame displayed in the timeline display area may be only a limited view of the monitored events. For example, the timeline display area may be configured to display a certain range of time over which the displayed metric was monitored. For example, monitored metric data may be available for a period of several hours, days, weeks, months, or more. The timeline display area may be configured to graphically display a small portion of the available data. In one example, the timeline display area can be configured to default to a time period including the latest problematic metric performance. As another example, the display area can be configured to default to a most recent range of monitored time.

An administrator can be enabled to change the time period to include data over a longer or shorter time period. Also, the timeline display area can include the time slider, as described above. When a desired view of the timeline graph is displayed in the timeline display area, such as after an administrator has performed any desired modifications to a position along the time line or a range of time displayed in the display area, a portion of the displayed snapshot can be highlighted for problem isolation. In one example, the displayed snapshot can change depending a position along the timeline. For instance, certain events may be causally or otherwise linked together to form the snapshot. If the administrator alters the displayed time frame to display events not related to the displayed snapshot, a different snapshot related to the displayed events can be shown.

Figure 6:
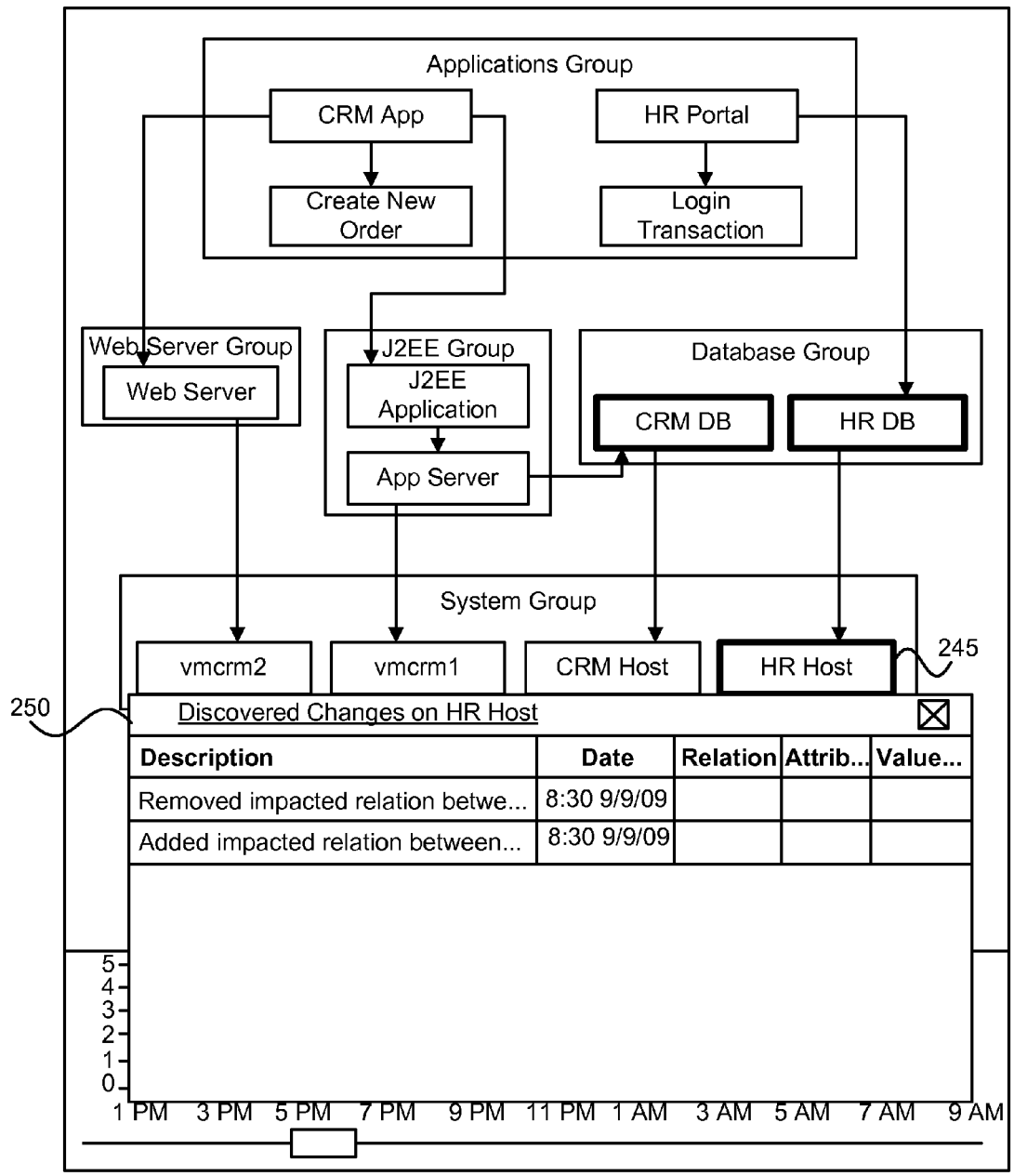
FIG. 6 is a view of a snapshot of a problem topology including a detailed display of discovered changes for a configuration item in accordance with an example.

Referring to FIG. 6, a view of a snapshot of a problem topology is shown which including a detailed display 250 of discovered changes for a configuration item. In one aspect, the detailed display can be displayed when a user selects a particular event. The detailed display can include information about the selected event, including a CI related to the event. In another aspect, the detailed display can be displayed when a user selects a CI from the snapshot. The detailed display can display events related to the selected CI at one or more selected times. For example, the detailed display may display events related to the selected CI which are included in the time frame displayed for the timeline. In FIG. 6, multiple discovered changes are displayed for the CI "HR Host" 245.

Figure 7:
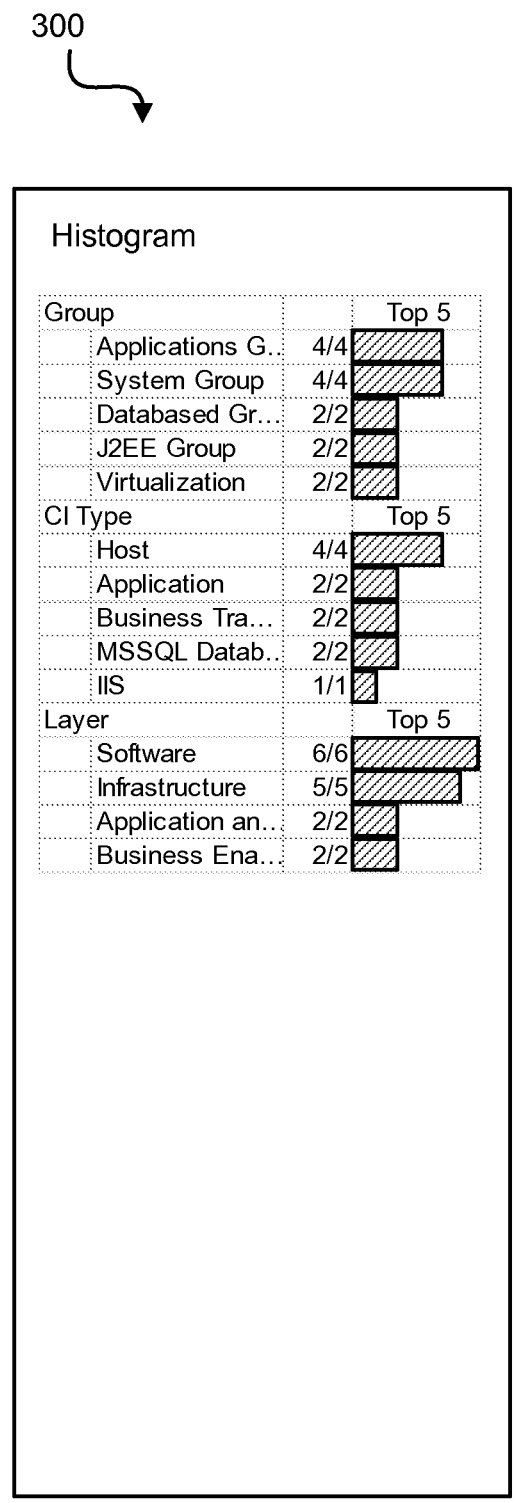
FIG. 7 is a view of a histogram display in accordance with an example.

FIG. 7 depicts a block diagram of a histogram display 300 of monitored metrics in accordance with an example. The histogram display can display histograms or frequency distributions generated by a histogram module. The histograms can represent a variety of different details relating to the metrics in the metric list. For example, the histogram display can display how many metrics of a particular metric group breached a baseline, or how often or how many times a particular metric breached a baseline, such as within a predetermined time period. Virtually any form of desired histogram based on the metrics can be displayed in the histogram display. In one aspect, the histograms can be sorted according to various factors, such as CI group, CI type, layer, location, data collector, and so forth.

While analyzing problems in a virtualized environment, the topology of the IT system at the time of the problem and any changes that occurred at or near that time can be useful in understanding the problem. The flexible architecture of virtual environments tends to create situations where the environment has changed, such as a machine moving from one hosting server to another for example, between the time the problem was detected and the time when the administrator can analyze the problem. Such scenarios can mislead or confuse a user and the user may spend time trying to analyze irrelevant configuration items.

In most other systems, snapshots are taken only on a periodic basis and can include an entire topology. These other systems are not able to take a topological snapshot of problems when the problems are detected or a snapshot of only the portion of the topology involved in the problem.

As described above, problem isolation systems can detect abnormalities or irregularities of metrics of CIs in near real-time analysis. Metrics can be defined as abnormal, irregular, or anomalous if continuously breaching a baseline or baseline sleeve. The systems can implement analysis cycles to periodically detect abnormal metrics. The analysis cycles can be set to run at predetermined time intervals, such as every five minutes for example. On each analysis cycle, the problem isolation system can detect all continuously abnormal metrics, find the related configuration items for each metric, group all related configuration items based on an Operations Database (ODB) model within the PMDB, and connect each group of CIs on a graph which represents a single problem topology.

Figure 8:
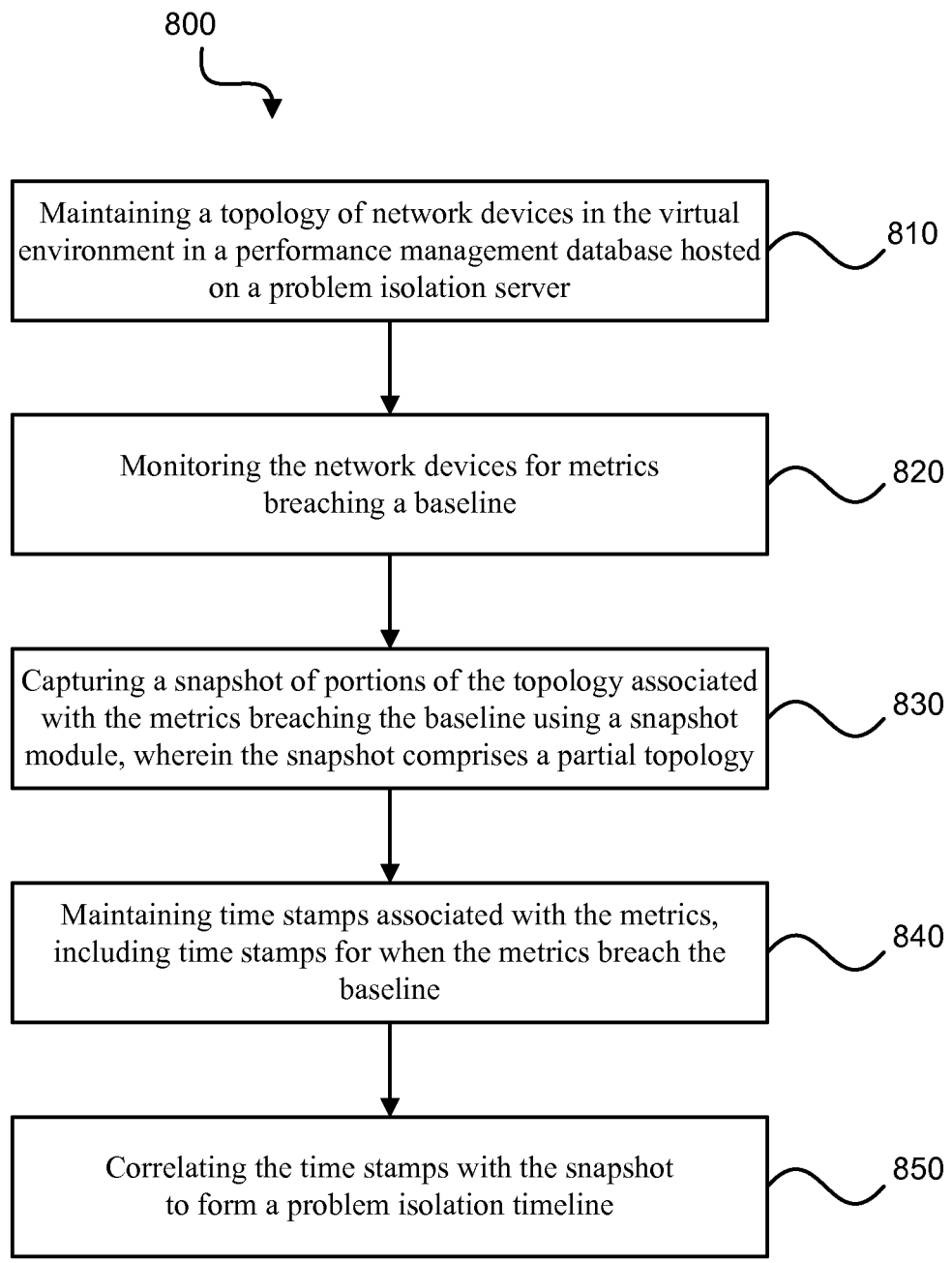
FIG. 8 is a flow diagram of a method for isolating problems in a virtual environment in accordance with an example.

In one example shown in FIG. 8, a method 800 is disclosed which includes maintaining 810 a topology of network devices in a virtual environment in a performance management database hosted on a problem isolation server. The network devices can be monitored 820 for metrics breaching a baseline. A snapshot of portions of the topology associated with the metrics breaching the baseline can be captured 830 using a snapshot module. The snapshot captured can include a partial topology. In one aspect, the baseline comprises a baseline sleeve and monitoring the network devices comprises monitoring the network devices for metrics breaching the baseline sleeve. Time stamps associated with the metrics can be maintained 840. The time stamps can include time stamps for when the metrics breach the baseline. The time stamps can be correlated 850 with the snapshot to form a problem isolation timeline.

The method can include simultaneously displaying the snapshot and the problem isolation timeline to a user. The method can also include highlighting one or more portions of the snapshot based on a displayed time position of the problem isolation timeline. For example, multiple portions of the snapshot can be highlighted when multiple metrics are associated with time stamps occurring during the displayed time position of the problem isolation timeline.

The method can also include identifying metric groupings for the metrics breaching the baseline and creating a histogram of the metrics breaching the baseline to identify a frequency of baseline breaches for each of the metric groupings. In this example, the snapshot, the problem isolation timeline, and the histogram can all be simultaneously displayed to a user via a display device.

In another example, a method for problem isolation in a virtual environment includes maintaining a topology of network devices in the virtual environment in a performance management database hosted on a problem isolation server and monitoring the network devices for metrics breaching a baseline. A snapshot of portions of the topology associated with the metrics breaching the baseline captured. Time stamps can be maintained which are associated with the metrics, including time stamps for when the metrics breach the baseline. The time stamps can be correlated with the snapshot to form a problem isolation timeline. The snapshot and the problem isolation timeline can be simultaneously displayed to a user via a display device. A sequence of events that occurred on the snapshot along the problem isolation timeline can be replayed to a user. For example, the sequence of events can be replayed by sliding the time slider to move the timeline. In another example, a replay module can be used to automatically slide the timeline and show event occurrences along with snapshots highlighting in a chronological order.

A useful piece of information for performing an effective problem isolation analysis can be to understand a problem topology, including CIs and CI relationships. Understanding both the topology and a time sequence can assist in performing more effective problem analysis. The topology based investigation tools described herein can enable a user to easily understand a detected problem topology, and to understand the sequence of events and changes that happened on that topology. Additionally, the systems and methods enable a user to replay the sequence of events that happened on the topology.

With the problem isolation systems and methods described herein, all events or monitored data can come into a single operations bridge. The events and data can be used to establish a problem topology snapshot which can be used to determine root events. The snapshot data can be used to determine actionable system conditions, and actions taken can be prioritized based on business impact. In some instances, a problem isolation system can be configured to identify or verify a root cause of a system problem based on the problem topology snapshot automatically, such as by using run-book automation. To aid a system administrator in identifying problems from the problem isolation snapshot, the snapshot can be enriched with extra state information and/or expert advice.

Some benefits of using the technology include: accurate problem topology modeling in a highly flexible environment, such as a virtualized data center; the ability to track the changes on that captured topology around the snapshot time frame; relatively small storage foot prints: since the topology snapshots are taken only once a problem is detected and only a minimum set of CI's is captured, the technology uses only a small storage footprint. The combination of a strong, detailed ODB model with near-real-time problem detection capabilities creates a unique benefit for capturing snapshots from both an accuracy and a capacity perspective. Such a snapshot tool can provide enhanced and useful capabilities for a problem isolation or analysis system.

The methods and systems of certain examples may be implemented in hardware, software, firmware, or combinations thereof. In one example, the method can be executed by software or firmware that is stored in a memory and that is executed by a suitable instruction execution system. If implemented in hardware, as in an alternative example, the method can be implemented with any suitable technology that is well known in the art.

Also within the scope of an example is the implementation of a program or code that can be stored in a non-transitory machine-readable medium to permit a computer to perform any of the methods described above.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI (Very Large Scale Integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A method for problem isolation in a virtual environment, comprising:
maintaining a topology of network devices in the virtual environment in a performance management database hosted on a problem isolation server;
monitoring the network devices for metrics breaching a baseline;
capturing a snapshot of portions of the topology associated with the metrics breaching the baseline using a snapshot module, wherein the snapshot comprises a partial topology;
maintaining time stamps associated with the metrics, including time stamps for when the metrics breach the baseline; and
correlating the time stamps with the snapshot to form a problem isolation timeline.

2. A method as in claim 1, further comprising simultaneously displaying the snapshot and the problem isolation timeline to a user.

3. A method as in claim 2, further comprising highlighting a portion of the snapshot based on a displayed time position of the problem isolation timeline.

4. A method as in claim 3, wherein highlighting a portion of the snapshot comprises highlighting multiple portions of the snapshot when multiple metrics are associated with time stamps occurring during the displayed time position of the problem isolation timeline.

5. A method as in claim 2, wherein displaying the snapshot comprises displaying relationships between the portions of the topology associated with the metrics breaching the baseline.

6. A method as in claim 5, wherein the relationships comprise at least one of causal, topological, and chronological relationships.

7. A method as in claim 1, wherein the baseline comprises a baseline sleeve and monitoring the network devices comprises monitoring the network devices for metrics breaching the baseline sleeve.

8. A method as in claim 1, further comprising:
identifying metric groupings for the metrics breaching the baseline; and
creating a histogram of the metrics breaching the baseline to identify a frequency of baseline breaches for each of the metric groupings.

9. A system for problem isolation in a virtual environment, comprising:
a physical problem isolation server;

a performance management database hosted on the physical problem isolation server and operable to maintain a topology of network devices in the virtual environment;

a monitoring device operable to monitor the network devices for metrics breaching a baseline;

a snapshot module hosted on the physical problem isolation server, the snapshot module to take a snapshot of portions of the topology associated with the metrics breaching the baseline, wherein the snapshot comprises a partial topology;

a timer configured to maintain time stamps associated with the metrics, including time stamps for when the metrics breach the baseline; and a correlation engine operable to correlate the time stamps with the snapshot to form a problem isolation timeline.

10. A system as in claim 9, further comprising a display module configured to simultaneously display the snapshot and the problem isolation timeline to a user via a display device.

11. A system as in claim 10, further comprising highlighting module configured to enable a user to highlight a portion of the snapshot based on a displayed time position of the problem isolation timeline.

12. A system as in claim 11, further comprising a highlighting analysis module configured to determine when multiple metrics are associated with time stamps occurring during the displayed time position of the problem isolation timeline and to instruct the highlighting module to highlight multiple portions of the snapshot.

13. A system as in claim 10, further comprising a relationship identification module configured to identify relationships between the portions of the topology associated with the metrics breaching the baseline, the relationship identification module being in communication with the display module to display the relationships between the portions of the topology associated with the metrics breaching the baseline.

14. A system as in claim 9, further comprising a drill-down module for enabling a user to select a network device from the snapshot to view additional details regarding one or more metrics associated with the network device which breached the baseline.

15. A system as in claim 9, further comprising:

a metric grouping identification module configured to identify metric groupings for the metrics breaching the baseline; and a histogram creation module configured to create a histogram of the metrics breaching the baseline to identify a frequency of baseline breaches for each of the metric groupings.

* * * * *